United States Patent
Cooper

[19]

[11] Patent Number: 6,081,294

[45] Date of Patent: *Jun. 27, 2000

[54] VIDEO PROCESSING SYSTEM

[75] Inventor: Alan Neal Cooper, Coppell, Tex.

[73] Assignee: Texas Instruments Incorporated, Dallas, Tex.

[*] Notice: Under 35 U.S.C. 154(b), the term of this patent shall be extended for 1063 days.

[21] Appl. No.: 08/627,838

[22] Filed: Apr. 3, 1996

Related U.S. Application Data

[63] Continuation of application No. 08/367,666, Jan. 3, 1995, abandoned, which is a continuation of application No. 08/130,543, Oct. 1, 1993, abandoned.

[51] Int. Cl.[7] .................................................. H04N 5/235
[52] U.S. Cl. ........................................... 348/221; 348/224
[58] Field of Search ...................... 348/221, 224, 348/228, 230, 255, 296, 297, 367, 312; 354/400

[56] References Cited

U.S. PATENT DOCUMENTS

| | | | |
|---|---|---|---|
| 4,051,353 | 9/1977 | Lee ........................................... | 364/716 |
| 4,686,571 | 8/1987 | Suzuki ..................................... | 348/322 |
| 4,701,626 | 10/1987 | Ishizaki et al. .......................... | 250/578 |
| 4,742,395 | 5/1988 | Nagai et al. ............................. | 348/296 |
| 4,769,710 | 9/1988 | Uchida ..................................... | 348/294 |
| 4,984,002 | 1/1991 | Kokubo .............................. | 358/213.13 |
| 5,040,070 | 8/1991 | Higashitsutsumi et al. ............ | 358/213 |
| 5,043,801 | 8/1991 | Watanabe ................................. | 358/29 |
| 5,157,502 | 10/1992 | Nakajima et al. .................. | 358/213.19 |
| 5,184,006 | 2/1993 | Ueno ........................................ | 348/312 |
| 5,233,428 | 8/1993 | Alford et al. ............................ | 358/213 |

FOREIGN PATENT DOCUMENTS

| | | | |
|---|---|---|---|
| 0 583 143 a2 | 2/1994 | European Pat. Off. ....... | H04N 5/235 |

OTHER PUBLICATIONS

"A New Timing Control IC for CCD Camera System", Mochizuki, et al., International Conference on Consumer Electronics Digest of Technical Papers, Jun. 8, 1993, Rosemont, IL.

Patent Abstracts of Japan, vol. 18, No. 397 (E–1583), Jul. 26, 1994, JP–A–06–113 194.

*Primary Examiner*—Matthew Bella
*Attorney, Agent, or Firm*—Alan K. Stewart; Wade James Brady, III; Frederick J. Telecky, Jr.

[57] ABSTRACT

A video processing system (10) is provided that comprises an image sensor image area (14) that operates to transfer an image to an image memory (18) to be processed by a video processor (16). The exposure length of the image is controlled by an iris controller (24) which comprises a signal decoder (30). An IMAGE CLEAR signal is juxtaposed with an IMAGE TRANSFER signal to set the length of the exposure. The IMAGE CLEAR signal is generated by an iris counter (36) and an iris signal decoder (34). The maximum count used by the iris counter (36) is set using a count length set circuit (38) which receives command signals generated by monitoring the video output.

19 Claims, 2 Drawing Sheets

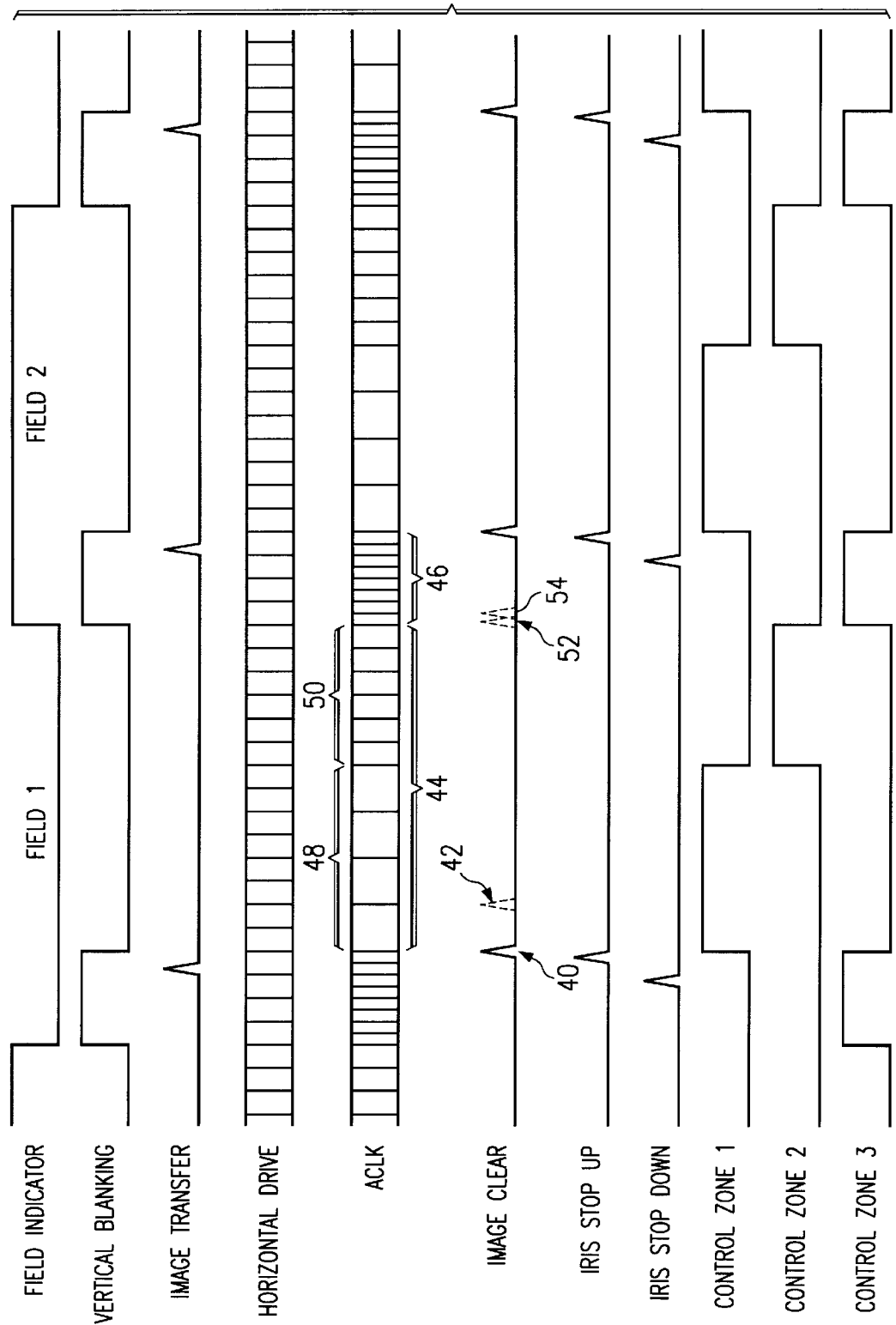

VIDEO PROCESSING SYSTEM

This application is a Continuation of application Ser. No. 08/367,666, filed Jan. 3, 1995 now abandoned, which is a continuation of Ser. No. 08/130,543, filed Oct. 1, 1993 now abandoned.

TECHNICAL FIELD OF THE INVENTION

This invention relates in general to the field of electronic systems and more particularly to an improved video processing system.

BACKGROUND OF THE INVENTION

Electronic iris controllers have been developed to eliminate the need for or supplement a mechanical iris to control the amount of light that impinges on a solid state electronic image sensor. An electronic iris controls the exposure time by periodically exposing or removing the charge generated by the photon-generated hole-electron pairs within the image sensor. This process of periodic destruction or removal of charge is referred to as the clearing of the image sensor. The charge is also removed from the image sensor when the signal from the image sensor is transferred to an image memory associated with the image sensor. This process is referred to as the image transfer. The length of time between the clearing of the image and the transfer of the image sets the electronic exposure time. By altering the relative positions of the image clear operation and the image transfer operation, the length of exposure time can be controlled electronically.

The image memory is capacitively coupled to the image sensor. Accordingly, during the readout of information from the image memory, no other operations are performed on the image sensor or the image memory to minimize interference with the readout sequence. For most television applications, the maximum exposure time for a field of data is 16.67 milliseconds. A typical field of television data comprises 262.5 lines of information. This sets the minimum exposure at 63.5 microseconds for operations during the readout of the image memory, due to the fact that all image clear or image transfer operations must occur during the horizontal blanking period or vertical blanking period. Iris control has typically been limited to exposure adjustments in 63.5 microseconds increments only. This incremental change of exposure time creates a problem in that the percentage change of exposure is extremely non-linear in that the initial incremental changes are very small compared to the entire 16.67 millisecond field time and the final incremental changes can result in exposure changes up to and including fifty percent.

SUMMARY OF THE INVENTION

Accordingly, a need has arisen for an electronic iris controller that provides for exposure control in a more linear fashion. In accordance with the teachings of the present invention, an electronic iris controller is provided that substantially eliminates or reduces disadvantages and problems associated with prior systems.

According to one embodiment of the present invention, a video processing system is provided that comprises an electronic iris controller operable to alter an exposure time associated with the system in sequential increments. The system further comprises an image sensor and an image memory operable to generate and store image data. The electronic iris controller is operable to output an image clear signal and an image transfer signal that determines the exposure time of the image.

BRIEF DESCRIPTION OF THE DRAWINGS

A more complete understanding of the advantages associated with the system of the present invention may be acquired by referring to the Detailed Description of the Invention taken in conjunction with the accompanying FIGUREs in which like reference numbers indicate indicate like features and wherein:

FIG. 3 is a timing diagram illustrating a number of signals used in the iris controller and video processing system of the present invention.

DETAILED DESCRIPTION OF THE INVENTION

Figure 1:
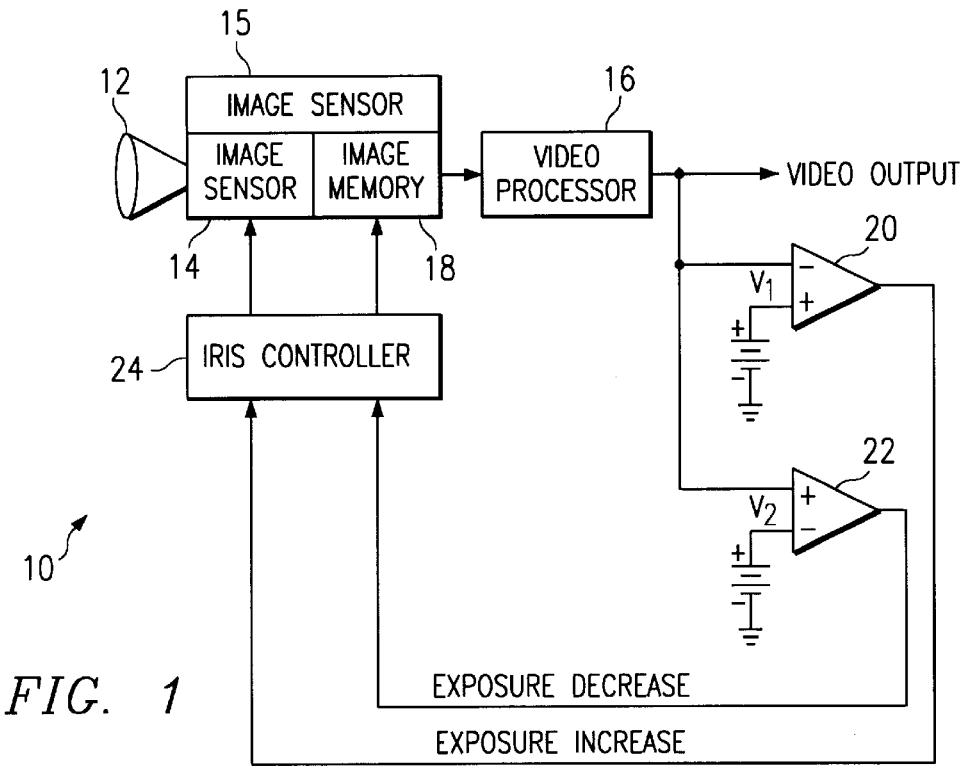
FIG. 1 is a schematic block diagram of a video processing system constructed according to the teachings of the present invention.

Referring to FIG. 1, a video processing system indicated generally at 10 is shown to comprise a lens 12 which focuses light on an image area 14 of an image sensor 15. Periodically, image data is transferred from the image area 14 to an image memory 18. The video processor 16 retrieves the image data from image memory 18 and outputs it as a VIDEO OUTPUT signal. The VIDEO OUTPUT signal is also routed to a first comparator 20 and a second comparator 22. The first comparator 20 compares the average level of the VIDEO OUTPUT signal to a first reference voltage $V_1$. Similarly, the second comparator 22 compares the average level of the VIDEO OUTPUT signal to a second reference voltage $V_2$. When the average of the VIDEO OUTPUT signal falls below the reference level $V_1$, the exposure of the image needs to be increased. Accordingly, comparator 20 outputs an EXPOSURE INCREASE signal to an iris controller circuit 24. Similarly, if the average level of the VIDEO OUTPUT signal rises above the reference level $V_2$, the exposure of the image must be decreased. The comparator 22, therefore, outputs an EXPOSURE DECREASE signal to iris controller 24. The iris controller 24 outputs signals to the image sensor image area 14 and to the image memory 18. Iris controller 24 operates, in part, to control two functions of the image sensor image area 14 and image memory 18. The image sensor image area 14 periodically transfers the image to the image memory 18. The transfer of data from the image sensor image area 14 to the image memory 18 destroys the charge stored in the image sensor image area 14. The charge in image sensor image area 14 is created by photon-generated electron-hole pairs within the semiconductor image sensor image area 14 created by light focused on the image sensor image area 14 through lens 12. The iris controller 24 also periodically instructs the image sensor image area 14 to clear the image from image sensor image area 14. This clearing function is also accomplished by draining the charge from the image sensor image area 14 in a similar manner to the method used to transfer the charge to the image memory 18. The time between the clearing of the image sensor image area 14 and the transfer of image data from image sensor image area 14 to image memory 18 is the electronic exposure time. Accordingly, the iris controller 24 can control the exposure time of the image stored in image sensor image area 14 by controlling the times at which the signals instructing the image sensor image area 14 and the image memory 18 to clear the image sensor image area 14 and to transfer the image data from image sensor image area 14 to image memory 18 occur.

The image sensor image area 14 and image memory 18 comprise charge-coupled devices which are capacitively coupled to one another. Accordingly, the transfer and clear operations controlled by iris controller 24 cannot be performed while the video processor 16 is reading image data. If these operations are performed during the reading process, the image stored within the image sensor can be disturbed.

Video images are typically organized as pairs of interlaced fields, each comprising 262.5 lines of image data. These two fields together constitute a single video frame comprising 525 lines. The images are read out line-by-line by the video processor 16 from the image memory 18. There are two typical varieties of image sensors which may comprise image sensor image area 14 and image memory 18. The first variety is a line addressable image sensor where each line is transferred on an individual basis to the image memory 18. The second type of image sensor is a frame transfer image sensor. Frame transfer image sensors transfer the entire image to image memory at one time. The video processor 16 functions in a similar manner regardless of whether image sensor image area 14 and image memory 18 are line addressable or frame transfer systems. The video processor 16 functions to output the video image data on a line-by-line basis through the VIDEO OUTPUT signal.

After the video processor 16 reads out a line of image data from the image memory 18, there is a finite delay which is referred to as the horizontal blanking period. The horizontal blanking period is the time it takes for the electron beam to scan horizontally back across the cathode ray tube (CRT) after it has drawn a line of image. During the horizontal blanking period, no activity is performed by the video processor 16 on the data stored in image memory 18. Accordingly, the image clear and image transfer functions can occur during the horizontal blanking period.

In addition, there is a longer delay referred to as the vertical blanking period at the beginning of each field of video data. The vertical blanking period is typically on the order of 1.27 milliseconds in length and constitutes the time required for the electron beam to scan back from the bottom right-hand corner of the CRT display to the top left-hand corner of the CRT display. Similar to the horizontal blanking period, no operations are performed on the data stored in image memory 18 by the video processor 16 during the vertical blanking period. Accordingly, the image clear and image transfer functions can occur at any point within the vertical blanking period.

The relative position of the image transfer and image clear operations control the electronic exposure of the image on the image sensor 15. The only time that the image clear and image transfer functions can occur is either during the horizontal blanking period which occurs once every 63.5 microseconds or any time during the vertical blanking period which occurs twice during a frame of video data at the beginning of each field and lasts approximately 1.2 milliseconds.

Figure 2:
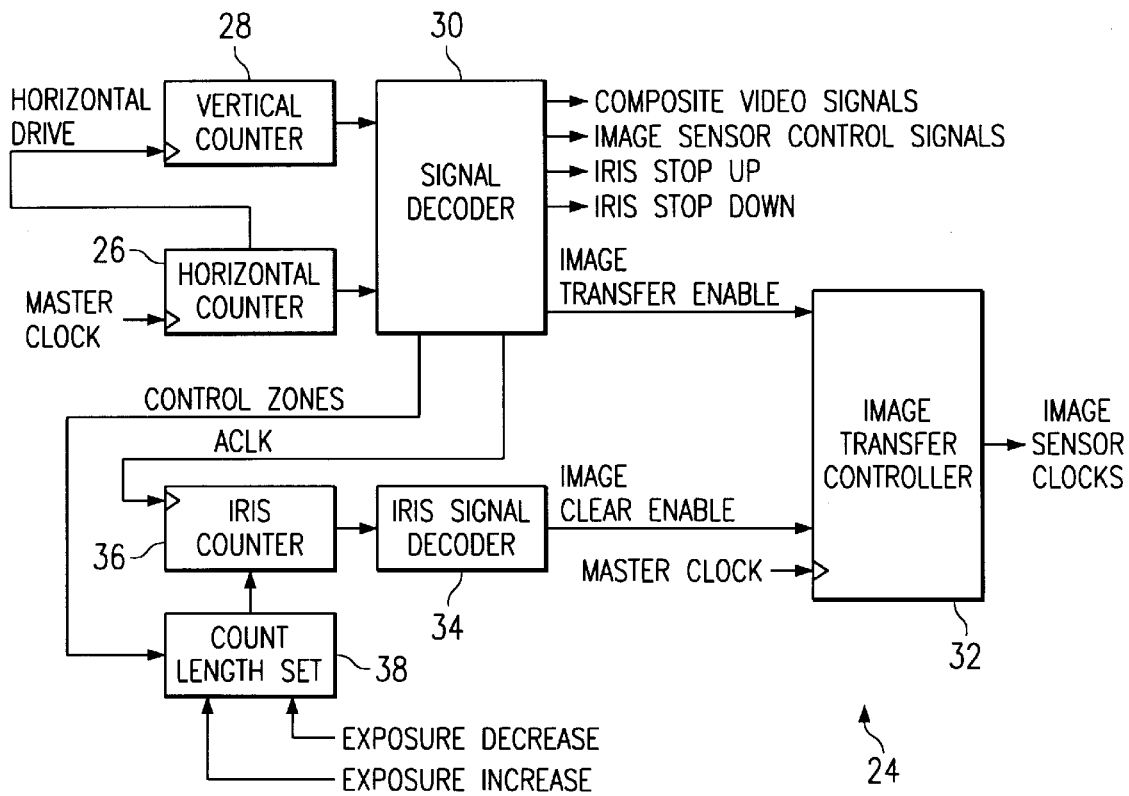
FIG. 2 is a schematic block diagram of an iris controller circuit constructed according to the teachings of the present invention.

FIG. 2 illustrates one embodiment of iris controller 24 constructed according to the teachings of the present invention that capitalizes on both the horizontal blanking and the vertical blanking period to implement a floating phase iris controller that enables control of the image sensor 15 to approach linear operation. Referring to FIG. 2, a MASTER CLOCK signal is used to drive a horizontal counter circuit 26. The horizontal counter circuit 26 is used to address the horizontal position within a single line of the video image. The horizontal counter circuit 26 increments as driven by the MASTER CLOCK signal until it reaches a maximum value and then resets. Upon resetting, a HORIZONTAL DRIVE signal is created and output to a vertical counter circuit 28. The horizontal counter value is output to a signal decoder circuit 30. The vertical counter circuit 28 is incremented each time the horizontal counter circuit 26 reaches its maximum value at the end of the line of image data. Accordingly, the vertical counter circuit 28 is incremented each time a horizontal blanking period occurs. The value within the vertical counter circuit 28 is also output to signal decoder 30. The vertical counter circuit 28 counts to a maximum value which may comprise, for example, 525 or one count for each line in a complete frame of video data. Upon reaching the maximum value, the vertical counter circuit 28 resets and begins counting from one. The signal decoder 30 uses the vertical counter value and the horizontal counter value to determine when horizontal blanking and vertical blanking periods occur.

According to the embodiment shown in FIG. 2, the IMAGE TRANSFER signal is locked in phase with respect to the MASTER CLOCK and HORIZONTAL DRIVE signals. Accordingly, the signal decoder 30 outputs an image TRANSFER ENABLE signal to an image transfer controller circuit 32 whenever, according to one embodiment of the present invention, the IMAGE TRANSFER signal is transmitted by the signal decoder circuit 30 to the image transfer controller circuit immediately before the end of a vertical blanking period.

With the IMAGE TRANSFER signal locked in phase with the MASTER CLOCK and horizontal counter 26 and vertical counter 28 signal, the exposure of the image sensor can be controlled by adjusting the relative position of the IMAGE CLEAR signal also transmitted to the image transfer controller circuit 32. The IMAGE CLEAR signal is created by an iris signal decoder circuit 34 shown in FIG. 2. The iris signal decoder circuit receives a count from an iris counter 36. The iris counter 36 increments with each transition of an accordion clock signal (ACLK). The ACLK signal is referred to as an accordion clock signal because it is a non-linear clock signal that comprises a constant number of transitions for the time required to process a full frame of video data. However, the transitions of the ACLK signal do not occur in a linear fashion. The transitions are of differing duration and may be divided into control zones which will be discussed more completely herein.

The maximum count for the iris counter is set by a count length set circuit 38 shown in FIG. 2. The count length set circuit 38 receives CONTROL ZONE indicator signals from the signal decoder 30. The count length set circuit 38 also receives the EXPOSURE DECREASE and EXPOSURE INCREASE signals from comparators 20 and comparators 22 described with reference to FIG. 1 previously.

In operation, the exposure time between the IMAGE CLEAR signal and the IMAGE TRANSFER signal is held constant or adjusted by the iris counter 36 and the iris signal decoder 34. To hold the exposure time constant, the iris counter counts to a set number of transitions of the ACLK signal. As long as the maximum count length used by the iris counter 36 remains unchanged, the IMAGE CLEAR signal output by iris signal decoder 34 will remain fixed in phase with respect to the IMAGE TRANSFER signal output by signal decoder 30.

The exposure time is adjusted by allowing the IMAGE CLEAR signal to float in phase with respect to the IMAGE TRANSFER signal until the exposure length reaches the desired length of time. The IMAGE CLEAR signal is cause to float by altering the maximum count length used by iris counter 36 to count the transitions of the ACLK signal. The count length is altered by the count length set circuit 38 in response to the EXPOSURE DECREASE signal or the EXPOSURE INCREASE signal. The count length is increased by the count length set circuit 38 in order to decrease the exposure length and the count length will be decreased in order to increase the exposure length.

Referring to FIG. 3, a timing diagram is shown which illustrates the juxtaposition of some of the signals used in the operation of the system of the present invention. The first line of FIG. 3 is a FIELD INDICATOR signal. A low value of the field indicator indicates that the first field of the frame is being processed while a high value of the FIELD INDICATOR signal indicates that the second field of the frame is being processed. The second line within FIG. 2 indicates the VERTICAL BLANKING INDICATOR signal. The vertical blanking periods as shown occur at the beginning of each field and last for approximately 1.27 milliseconds. The next line of FIG. 3 indicates the IMAGE TRANSFER signal. The image transfer signal is a very short duration signal that occurs immediately before the end of the vertical blanking period. As discussed previously, the IMAGE TRANSFER signal allows for the transfer of the image from the image sensor image area 14 into the image memory 18. This transfer takes approximately 10 microseconds.

The next line of FIG. 3 illustrates the transitions on the HORIZONTAL DRIVE signal. Each vertical line within the representation of the HORIZONTAL DRIVE signal illustrates a transition that occurs simultaneously with a horizontal blanking period. For purposes of clarity, the actual duration of the horizontal drive transitions cannot be illustrated. An actual transition occurs every 63.5 microseconds and there are 525 transitions between the beginning of field 1 and the end of field 2. Further, there are approximately 21 actual transitions of the HORIZONTAL DRIVE signal during the vertical blanking period. For purposes of clarity and in order to teach advantages of the present invention, the HORIZONTAL DRIVE signal is shown with much larger transitions to illustrate the relationship of the HORIZONTAL DRIVE signal with the ACLK signal which follows.

As discussed with reference to FIG. 2 previously, the iris counter 36 receives the ACLK clock signal from the signal decoder 30 and uses the ACLK signal to trigger its counting operations. The iris signal decoder 34 generates the IMAGE CLEAR signal responsive to the value in the iris counter 36. Accordingly, the iris signal decoder 34 and the IMAGE CLEAR signal are effectively clocked off of the ACLK signal. As shown in FIG. 3, the IMAGE CLEAR signal corresponds to a transition of the ACLK signal. If the maximum count value for iris counter 36 is changed by count length set circuit 38, the IMAGE CLEAR signal will float to the next transition of the ACLK signal as indicated in phantom at reference number 42 in FIG. 3 effectively decreasing the exposure time of the system. The location of the IMAGE CLEAR signal for maximum exposure is indicated at reference 40 in FIG. 3.

If the IMAGE CLEAR signal were clocked directly from the HORIZONTAL DRIVE signal, the image clear would float in even increments from one transition of the HORIZONTAL DRIVE signal to the next. Although this method of adjusting the exposure would provide for an even change in the time of the exposure as the phase of the IMAGE CLEAR signal floated with respect to the phase of the IMAGE TRANSFER signal, the percentage change of each incremental change would vary in an extremely non-linear fashion. For example, the initial increment from the value of the IMAGE CLEAR signal providing the longest exposure period possible to the next-to-longest period possible comprises approximately a 0.4 percent change. In contrast, the last incremental change from the next-to-shortest to the shortest exposure time possible comprises a 50 percent change in exposure.

In order for the feedback process described in FIG. 1 to operate more efficiently, the percentage exposure change should be brought as close to a linear relationship as possible. The system of the present invention utilizes two methods for making the exposure change more linear.

The first method for adjusting the linearity of the exposure change is accomplished by creating the non-linear clock signal ACLK. As shown in FIG. 3, the ACLK signal comprises a constant number of transitions for the length of time necessary for a complete frame of video data. However, the transitions are spaced in an uneven manner to allow for longer transitions during the beginning of the field and extremely short transitions during the vertical blanking period. As discussed previously, the image clear process must occur during either a horizontal blanking period or the vertical blanking period. Accordingly, the transitions of the ACLK signal within, for example, region 44 shown in FIG. 3 each occur during a horizontal blanking period. Accordingly, the transitions within region 44 cannot occur more often than 63.5 microseconds. This constraint does not apply, however, to the vertical blanking period shown in region 46 in FIG. 3. Accordingly, the transitions of the ACLK signal may be spaced at any interval within region 46.

Region 44 can also be subdivided into region 48 and region 50 shown in FIG. 3. According to one exemplary embodiment of the present invention, the transitions of the ACLK signal within region 48 occur once every two times a horizontal blanking period occurs. Within region 50, a transition of the ACLK signal occurs every time a horizontal blanking period occurs. The progression of the ACLK signal provides that the incremental floating of the IMAGE CLEAR signal from one transition to another will comprise larger steps in some portions such as regions 48 and 50 of the time base and very fine transitions within other regions of the time base such as region 46. This variability in the transition length increases the linearity of the percentage change in the exposure time. The operation of the non-linear clock signal ACLK provides that the change in the exposure time from position 40 to position 42 will represent roughly the same percentage change in the exposure as the change in, for example, position 52 to position 54 shown in FIG. 3.

FIG. 3 also illustrates the IRIS STOP UP signal and the IRIS STOP DOWN signal which are created by signal decoder 30 and prevent the IMAGE CLEAR signal from floating past a predetermined limit as the exposure time is changed. If the IMAGE CLEAR signal was allowed to continue to float, the signal would pass immediately from the shortest exposure setting to the longest exposure setting. The IRIS STOP UP signal and IRIS STOP DOWN signal prevent this from occurring.

FIG. 3 also illustrates three exemplary control zone signals, the CONTROL ZONE 1 signal, CONTROL ZONE 2 signal and CONTROL ZONE 3 signal. The CONTROL ZONE signals are used by the system of the present invention to accomplish the second method of increasing the linearity of the exposure change of the system. The CONTROL ZONE signals indicate to the count length set circuit 38 where the IMAGE CLEAR signal resides within the time base. For example, the CONTROL ZONE 1 signal is active within region 48 described previously, the CONTROL ZONE 2 signal is active during region 50 described previously and the CONTROL ZONE 3 signal is active during region 46 corresponding to the vertical blanking period. The CONTROL ZONE signals are used to provide for changes in the maximum count of iris counter 36 that are greater than one. For example, during the initial stages of the time base in region 48, the iris counter 36 can cause the IMAGE CLEAR signal to transition by more than one transition by changing the maximum count by two or more instead of one. Even quicker transitions of the IMAGE CLEAR signal with respect to the IMAGE TRANSFER signal can be accomplished by changing the maximum count of the iris counter 36 by even larger amounts. The CONTROL ZONE signals are used to divide the time base into regions such that the combination of the non-linear ACLK clock signal and the use of selective maximum counts for the iris counter can be used to create a more linear percentage exposure change response. It should be understood that the CONTROL ZONE signals and the transitions of the ACLK signal included in the illustrated embodiment are solely for the purposes of teaching the advantages of the present invention and should not be construed to limit the present invention to this or any exemplary embodiment. The CONTROL ZONE signals and ACLK signal transitions can be used in any number of combinations to create whatever exposure response is required.

Although the present invention has been described in detail, it should be understood that various changes, substitutions and alterations may be made to the teachings disclosed herein without departing from the spirit and scope of the present invention which is solely defined by the appended claims.

What is claimed is:

1. A video processing system, comprising:
   an image sensor comprising an image area operable to receive light to form image data representative of an image, the image sensor operable to clear the image data from the image sensor responsive to an image clear signal;
   an image memory coupled to the image sensor image area and operable to receive the image data from the image sensor image area and to store the image data responsive to an image transfer signal, an exposure time associated with the image defined as the time between the image clear signal and the image transfer signal;
   an electronic iris controller circuit coupled to the image sensor image area and the image memory and operable to create and transmit the image clear signal and the image transfer signal, the electronic iris controller circuit operable to alter the exposure time in response to the image data by increments having variable length having increasingly smaller duration as the exposure time is decreased and having increasingly greater duration as the exposure time is increased; and
   an accordion clock signal having a constant number of transitions for a given period of time and having variable periods for at least some of the transitions, the increments having variable length are derived from the accordion clock signal.

2. The video processing system of claim 1 wherein the electronic iris controller circuit comprises:
   a signal decoder circuit operable to generate the accordion clock signal;
   an iris counter circuit coupled to the signal decoder circuit through the accordion clock signal and operable to increment an iris count value responsive to the accordion clock signal and further operable to reset the iris count value when a predetermined iris count value is reached;
   an iris signal decoder circuit coupled to the iris counter circuit and operable to generate and output the image clear signal responsive to the reaching of the predetermined count value by the iris counter circuit; and
   a count length set circuit operable to alter the predetermined iris count value responsive to exposure signals indicating the need to alter the exposure time.

3. The video processing system of claim 2 wherein the signal decoder circuit is operable to generate the image transfer signal at predetermined intervals having substantially constant duration.

4. The video processing system of claim 2 wherein the signal decoder circuit is coupled to the count length set circuit through at least one control zone signal wherein control zone signals are associated with the required change in the exposure time, the count length set circuit operable to change the predetermined iris count value by a change value responsive to a control zone signal.

5. The video processing system of claim 2 wherein the signal decoder circuit is coupled to the count length set circuit through a control zone signal, the control zone signal associated with the required change in the exposure time, the count length set circuit operable to change the predetermined iris count value by a change value of greater than one responsive to certain values of the control zone signal.

6. The video processor system of claim 2 wherein the exposure signals comprise an exposure increase signal and an exposure decrease signal, the system further comprising:
   a video processing circuit coupled to the image memory and operable to retrieve the image data from the image memory and operable to output video signals representative of the image to a display;
   a first comparator coupled to the video signals and a first predetermined comparator signal and operable to perform a first comparison of the video signals to the first predetermined comparator signal and to selectively output the exposure increase signal responsive to the first comparison; and
   a second comparator coupled to the video signals and a second predetermined comparator signal and operable perform a second comparison of the video signals to the second predetermined comparator signal and to selectively output the exposure decrease signal responsive to the second comparison.

7. The video processing system of claim 2 wherein the signal decoder circuit is further operable to generate and output an iris stop up signal and an iris stop down signal operable to limit the alteration of the exposure time.

8. A video processing system, comprising:
   an image sensor comprising an image area operable to receive light from an object to form an image, the image sensor operable to clear the image from the image sensor responsive to an image clear signal;
   an image memory coupled to the image sensor image area and operable to receive image data representing the image from the image sensor image area and to store the image data responsive to an image transfer signal, an exposure time associated with the image defined as the time between the image clear signal and the image transfer signal; and an electronic iris controller circuit coupled to the image sensor image area and the image memory and operable to create and transmit the image clear signal and the image transfer signal, the electronic iris controller circuit operable to alter the exposure time in response to the image data by sequential increments, at least some of the sequential increments having variable length having increasingly smaller duration as the exposure time is decreased and having increasingly greater duration as the exposure time is increased, the electronic iris controller circuit comprising:

a signal decoder circuit operable to generate an accordion clock signal having a constant number of transitions for a given period of time but having variable periods for at least some of the transitions, the signal decoder circuit operable to generate the image transfer signal at predetermined intervals having substantially constant duration;

an iris counter circuit coupled to the signal decoder circuit through the accordion clock signal and operable to increment an iris count value responsive to each transition of the accordion clock signal and further operable to reset the iris count value when a maximum iris count value is reached;

an iris signal decoder circuit coupled to the iris counter circuit and operable to generate and output the image clear signal responsive to reaching a predetermined count value by the iris counter circuit; and a count length set circuit operable to alter the maximum iris count value responsive to exposure signals indicating the need to alter the exposure time.

9. The video processing system of claim 8 wherein the signal decoder circuit is coupled to the count length set circuit through at least one control zone signal wherein each control zone signal is associated with the required change in the exposure time, the count length set circuit operable to change the predetermined iris count value by a change value responsive to a control zone signal.

10. The video processing system of claim 8 wherein the signal decoder circuit is coupled to the count length set circuit through a control zone signal, the control zone signal associated with the required change in the exposure time, the count length set circuit operable to change the predetermined iris count value by a change value of greater than one responsive to the control zone signal.

11. The video processor system of claim 8 wherein the exposure signals comprise an exposure increase signal and an exposure decrease signal, the system further comprising:

a video processing circuit coupled to the image memory and operable to retrieve the image data from the image memory and operable to output video signals representative of the image to a display;

a first comparator coupled to the video signals and a first predetermined comparator signal and operable to compare the video signals to the comparator signal and to selectively output the exposure increase signal responsive to the comparison; and a second comparator coupled to the video signals and a second predetermined comparator signal and operable to compare the video signals to the comparator signal and to selectively output the exposure decrease signal responsive to the comparison.

12. The video processing system of claim 8 wherein the signal decoder circuit is further operable to generate and output an iris stop up signal and an iris stop down signal operable to limit the alteration of the exposure time.

13. A method of processing a video image, comprising the steps of:

receiving light from an object to form an image using an image sensor having an image area;

clearing the image from the image sensor responsive to an image clear signal;

receiving image data representing the image from the image sensor and storing the image data responsive to an image transfer signal in an image memory coupled to the image sensor image area, an exposure time associated with the image is defined as the time between the image clear signal and the image transfer signal;

creating and transmitting the image clear signal and the image transfer signal using an electronic iris controller circuit coupled to the image sensor and the image memory;

altering the exposure time in response to the image data by sequential increments using the electronic iris controller circuit, at least some of the sequential increments having variable length having increasingly smaller duration as the exposure time is decreased and having increasingly greater duration as the exposure time is increased; and generating the sequential increments using an accordion clock signal having a constant number of transitions for a given period of time but having variable periods for at least some of the transitions.

14. The method of claim 13 and further comprising the steps of:

generating, in a signal decoder circuit, the accordion clock signal;

incrementing an iris count value in an iris counter circuit coupled to the signal decoder circuit through the accordion clock signal responsive to the accordion clock signal;

resetting the iris count value when a maximum iris count value is reached;

generating and outputting the image clear signal responsive to the reaching of the maximum count value by the iris counter circuit; and altering the maximum iris count value responsive to exposure signals indicating the need to alter the exposure time.

15. The method of claim 14 and further comprising the step of generating the image transfer signal at predetermined intervals having substantially constant duration.

16. The method of claim 14 and further comprising the step of changing the maximum iris count value by a change value responsive to a control zone signal, the signal decoder circuit coupled to the count length set circuit through at least one control zone signal, each control zone signal associated with the required change in the exposure time.

17. The method of claim 14 and further comprising the step of changing the maximum iris count value by a change value greater than one responsive to a control zone signal, the signal decoder circuit coupled to the count length set circuit through the control zone signal, the control zone signal associated with the required change in the exposure time.

18. The method of claim 14 wherein the exposure signals comprise an exposure increase signal and an exposure decrease signal, the method further comprising the steps of:

retrieving the image data from the image memory and outputting video signals representative of the image to a display;

performing a first comparison of the video signals to a first predetermined comparator signal in a first comparator coupled to the video signals and the first predetermined comparator signal;

selectively outputting the exposure increase signal responsive to the first comparison;

performing a second comparison of the video signals to a second predetermined comparator signal in a second comparator coupled to the video signals and the second predetermined comparator signal;

selectively outputting the exposure increase signal responsive to the second comparison.

19. The method of claim 13 and further comprising the steps of generating and outputting an iris stop up signal and an iris stop down signal operable to limit the alteration of the exposure time.

* * * * *